Dec. 6, 1966 R. B. ERNEST 3,289,724
SELF-LOCKING NUT HAVING SECURED LOCKING RING
Filed Feb. 20, 1964 4 Sheets-Sheet 1
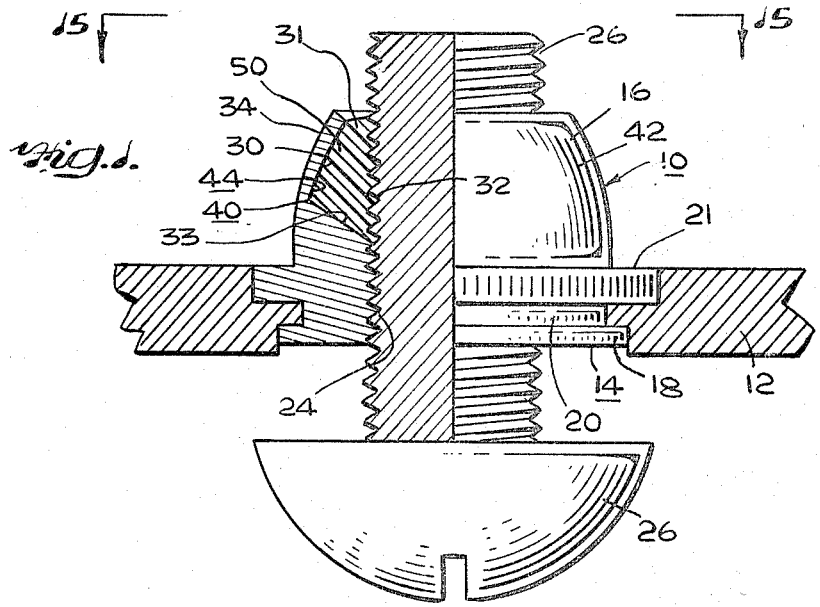
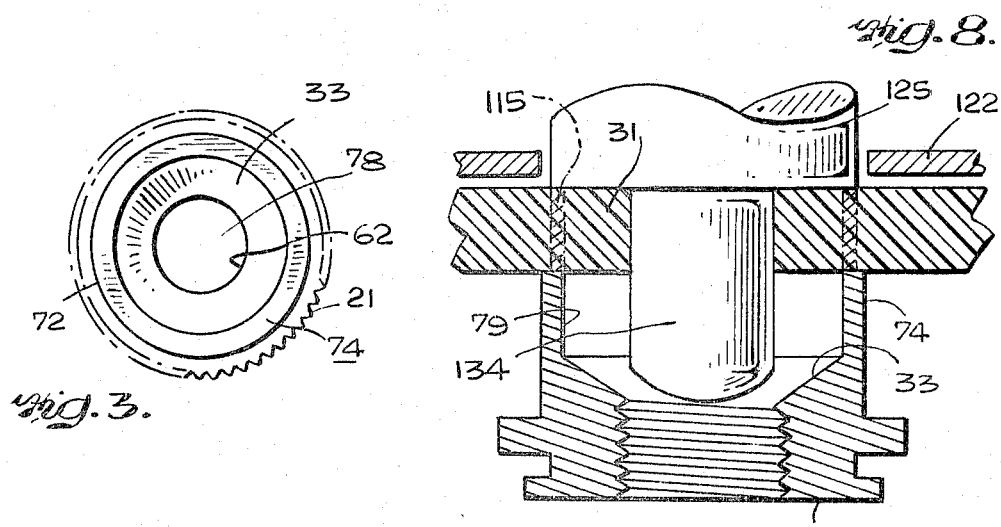
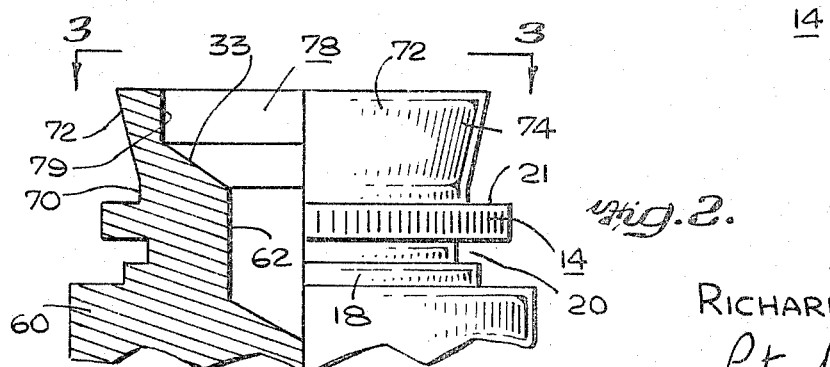
INVENTOR.
RICHARD B. ERNEST
BY Peter J. Patane
HIS ATTORNEY

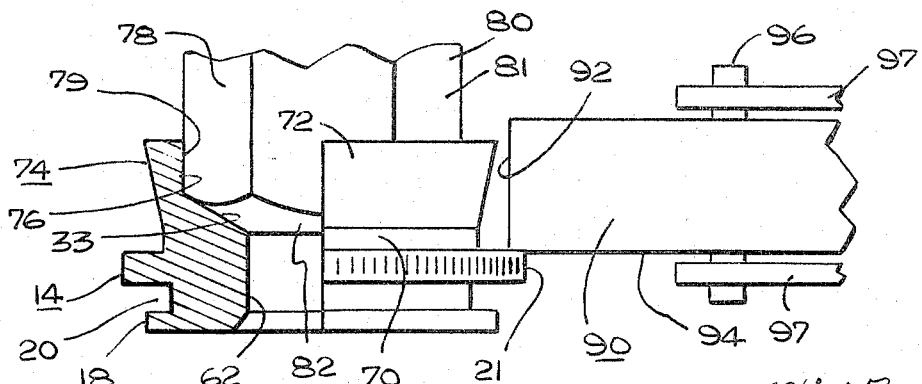
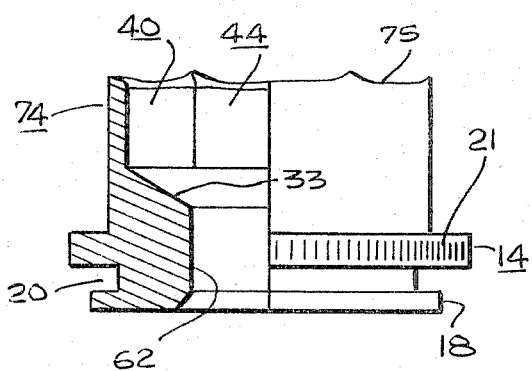
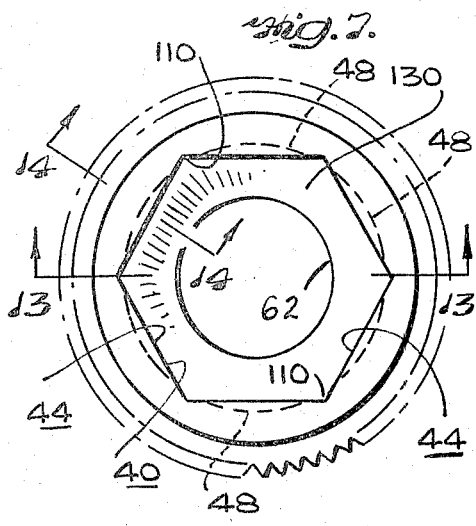
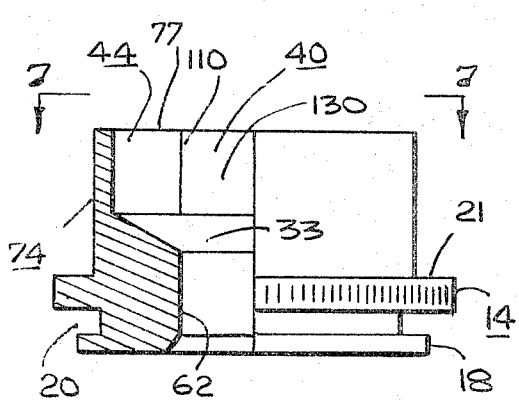
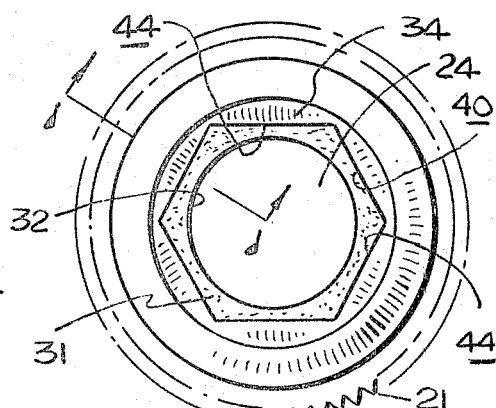

Dec. 6, 1966 R. B. ERNEST 3,289,724
SELF-LOCKING NUT HAVING SECURED LOCKING RING
Filed Feb. 20, 1964 4 Sheets-Sheet 3
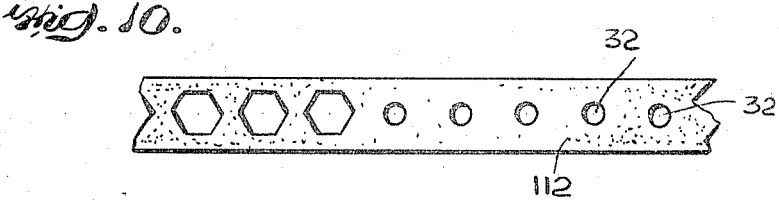
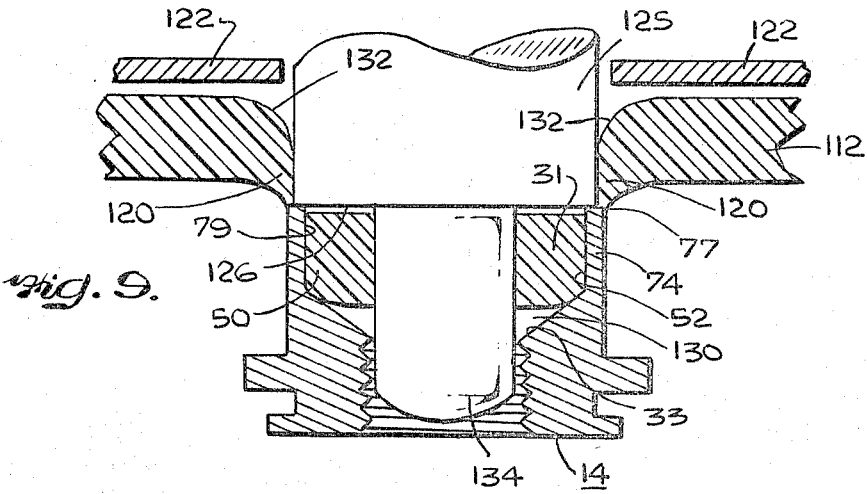
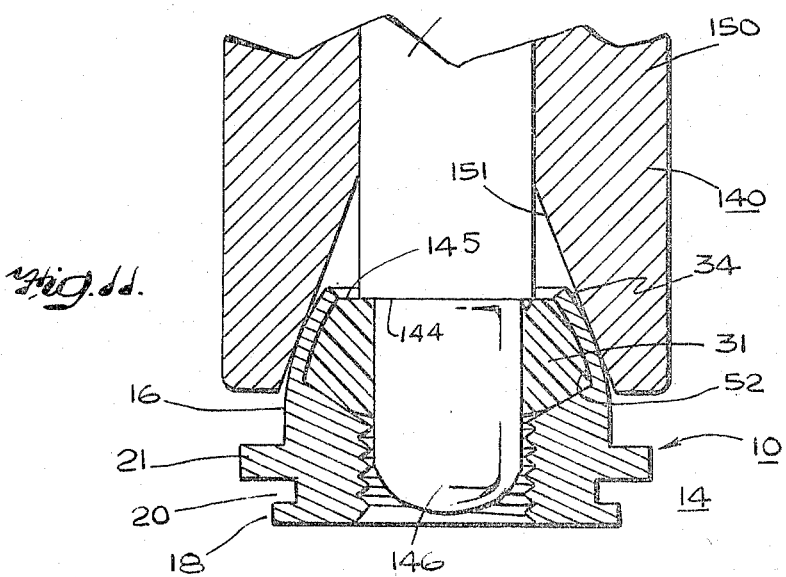
INVENTOR.
RICHARD B. ERNEST
BY Peter J. Patane
HIS ATTORNEY

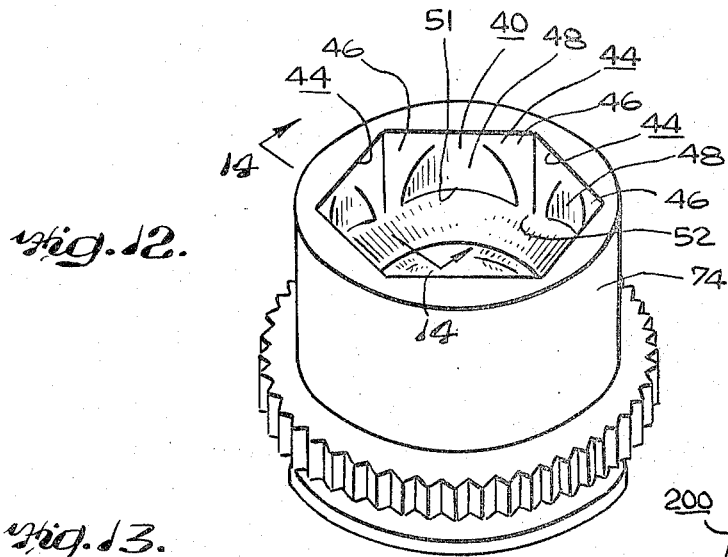
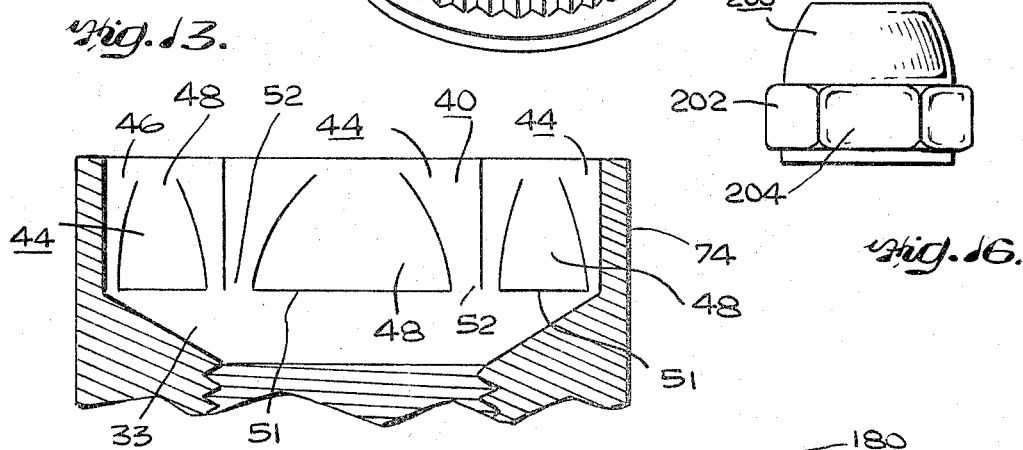
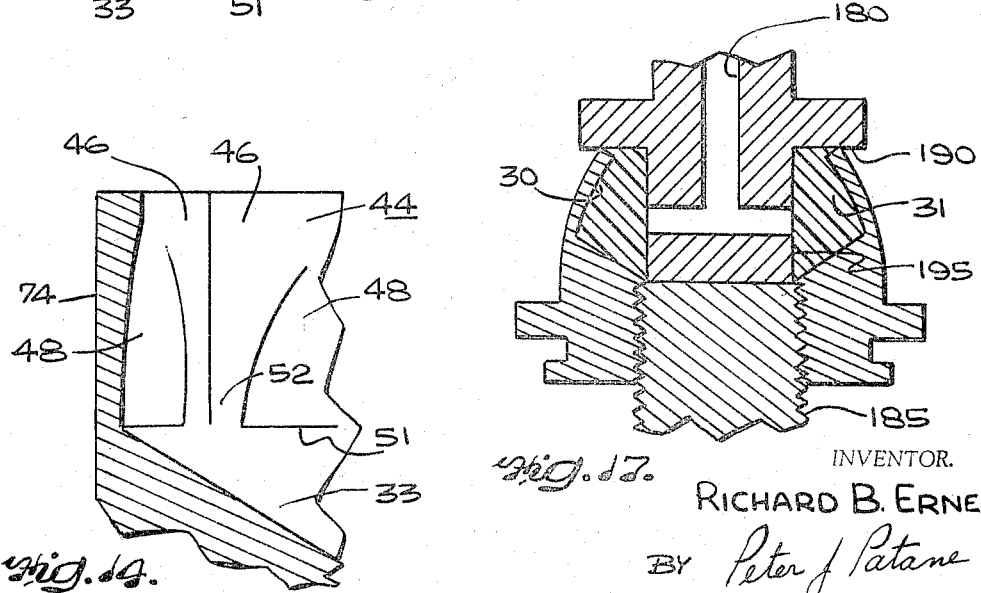

United States Patent Office 3,289,724
Patented Dec. 6, 1966

3,289,724
SELF-LOCKING NUT HAVING SECURED
LOCKING RING
Richard B. Ernest, Richboro, Pa., assignor to Penn Engineering and Manufacturing Corporation, Doylestown, Pa., a corporation of Delaware
Filed Feb. 20, 1964, Ser. No. 346,335
7 Claims. (Cl. 151—7)

This invention relates to self-locking nuts and methods of making them and particularly to an improved arrangement in a self-locking nut to retain a resilient locking ring and for substantially securing the locking ring against rotation when a screw is threaded into it, and it is an object of this invention to provide improved self-locking nuts and improved methods of making them.

In self-locking nuts which are presently known, locking rings of various material have been used to provide the locking feature of the nut and such rings have been restrained against the tendency to rotate (as the screw is threaded through the locking ring) by various arrangements. It is a further object of this invention to provide an improved arrangement in a self-locking nut to retain the locking ring and to restrain it against rotation, such improved arrangement being better adapted to mass production techniques.

One of the arrangements previously used to retain the locking ring and to restrain its rotation has been to roll an integral flange of the lock nut over the top of the locking ring. It is another object of this invention to provide a self-locking nut in which the locking ring is retained and restrained against rotation without the use of a flange rolled over upon the top of the locking ring, thereby reducing the height of the self-locking nut by the thickness of the rolled over flange and permitting the reduction of the outside diameter of the flange at the top of the self-locking nut.

It is customary to cadminum plate, or otherwise plate, carbon steel nuts to minimize corrosion and, at the same time, keep the cost of such items within a reasonable figure. This plating tends to flake on self-locking nuts due to the rolling or bending of the flange to overlie the top of the locking ring. Since in this invention the flange is not rolled or bent over upon the top of the locking ring, flaking of the plated flange is minimized.

A still further object of this invention is to provide a self-locking nut in which the bending of the flange to retain the plastic locking ring is minimal, so that insertion of the plastic locking ring and the required bending may be more readily accomplished after nuts made of carbon steel have been hardened and tempered, because heat treating of these nuts after the plastic locking ring has been added thereto would be injurious to locking rings constructed of some of the usual plastic materials, for example, nylon.

In the present invention, the locking ring is restrained against rotation by being housed in a cavity formed by an integral flange of the nut, the integral flange having a non-circular, annular inner wall which receives the non-circular, annular outer wall of the locking ring and thereby restrains the locking ring against rotation. To provide a conforming and tight fit between the locking ring and the inner, non-circular wall of the flange, the locking ring in this invention is assembled to the flange by being sheared between a punch and an upper edge portion of the flange, the punch having a face larger than the largest dimension across the cavity to be filled by the locking ring, and the flange is then bent radially inwardly to compress the locking ring radially inwardly and toward a seat, but no part of the flange is rolled or bent over the locking ring. Alternately, after the flange is bent radially inwardly, the locking ring may be molded into the cavity. Thus, a snug, close and tight, keying fit is provided between the outer wall of the locking ring and the inner non-circular wall of the flange which restrains rotation of the locking ring and prevents substantial axial movement of the locking ring, without any portion of the flange overlying the top of the locking ring.

The foregoing and other objects of my invention, the principles of my invention, and the best modes in which I have contemplated applying such principles will more fully appear from the following description and accompanying drawings in illustration thereof.

In the drawings,

FIG. 1 is a side elevation, partly in longitudinal section, of a self-locking nut embodying this invention;

FIG. 2 is a side elevation, partly in longitudinal section, of a nut blank before the top flange has been pressed against the arbor and before its separation from the bar stock from which it is being made;

FIG. 3 is a top view, at a reduced scale, of the nut blank illustrated in FIG. 2, omitting the bar stock for clarity;

FIG. 4 is a side elevation, showing the nut blank partly in longitudinal section, and illustrating an arbor and a roller for pressing a part of the nut blank against the arbor, but omitting the bar stock;

FIG. 5 illustrates, partly in elevation and partly in longitudinal section, the nut blank after pressing against the arbor illustrated in FIG. 4 has been completed, the roller illustrated in FIG. 4 being omitted in FIG. 5 as well as the bar stock;

FIG. 6 is a side elevation which is partly in longitudinal section also and illustrates the nut blank of FIG. 5 after its upper end has been trimmed and the nut blank has been cut from the bar stock;

FIG. 7 is a top or end view looking down upon the nut blank illustrated in FIG. 6 along the line 7—7 in FIG. 6;

FIG. 8 is a longitudinal sectional view illustrating a method of forming a locking ring taken prior to insertion of the latter into the nut blank;

FIG. 9 is a view similar to FIG. 8 but illustrating the locking ring after it has been inserted into the nut blank;

FIG. 10 is a top view of a portion of narrow strip stock from which the locking rings are punched;

FIG. 11 is a longitudinal sectional view, partly in elevation, illustrating a punch for bending radially inwardly the flange of the nut blank;

FIG. 12 is a perspective view looking down upon the top of the lock nut blank illustrated in FIGS. 6 and 7;

FIGS. 13 and 14 are partial enlarged views, partly in section and partly in elevation, taken along the line 13—13 in FIG. 7 and the lines 14—14 in FIGS. 7 and 12;

FIG. 15 is a top view of the nut illustrated in FIG. 1 but the screw and plate are omitted;

FIG. 16 is a side elevation view of a modification of this invention; and

FIG. 17 is a longitudinal, sectional view of a modification of this invention in which the locking ring is being molded in the nut blank.

Referring to the drawings, FIG. 1 illustrates a self-locking nut 10 incorporating this invention clinched or secured to a panel 12, the panel 12 being usually a sheeted plate and of ductile material such as sheet metal. The self-locking nut 10 comprises a body 14 and an integral extension 16, the body 14 being formed with a suitable annular shoulder 18, an undercut recess 20 and a knurled annulus 21 to be driven into and secured to the panel 12 when the shoulder 18 is inserted in a suitable hole in the panel 12, so that the knurled annulus 21 displaces a part of the panel material and forces it to flow into the undercut recess 20 for anchoring the nut securely to the panel 12.

Centrally extending through the nut 10 is a bore 24, the part of the bore extending through the body 14 and the part of the bore extending through the extension. The part of the bore 24 extending through the body 14 up to the lowest edge of the seat 33 is threaded, as illustrated, to receive the threads of a screw 26, as viewed in FIG. 1. The part of the bore 24 extending through the extension 16 above the aforementioned threaded part is enlarged into a cavity 30 which houses a counterbore or resilient locking ring 31 having a central hole 32 substantially coaxial with the bore 24.

The extension 16 comprises an internal annular seat or shoulder 33 and a radially inwardly, bent flange 34, the latter being thin in cross-section relative to the remainder of the nut. The bent flange 34 compresses the locking ring 31 radially and inwardly and also downwardly toward and against the seat 33, FIG. 1.

The flange 34 is formed with an irregular or non-circular annular inner wall or surface 40 and a substantially circular, peripheral, outer wall or surface 42, FIG. 1, as hereinafter described in further detail. The non-circular inner wall 40 is generally of hexagon shape, being divided into six inclined, bent flats or sections 44, so that looking down upon the nut, FIG. 15, one sees a familiar hexagon shape. Referring to FIGS. 12, 13 and 14, the flats or sections 44 are illustrated before the flange 34 is bent to the position of FIG. 1, and it is seen that the flats or sections 44 are each formed by two flat surfaces 46 which are widest at the top of the flange 34 and which taper down and blend in with central and radially outwardly recessed sections or depressed wall portions 48 which, at the juncture line 51 of the flange 34 with the seat 33, has substantially a circular shape but for the portion adjacent the lower corners 52 of the hexagon. Since the recessed sections or walls 48 are recessed radially outwardly, see FIG. 14, the recessed sections or walls 48 may also be said to be undercut relative to the wide portions of the extension 16, FIG. 13. The bending of the flange 34 inwardly, FIG. 1, further emphasizes the undercut aspect of the recessed sections or walls 48 relative to the upper end portion of the extension 16.

The locking ring 31 has an outer surface 50 which mates with and is keyed to the inner flange wall 40 and also has a general hexagon shape at its upper end (FIG. 15) and an enlarged, lower portion (FIG. 1) received in and keyed with the recessed sections or walls 48, whereby the mating hexagon shapes of the flange 34 and ring 31 restrain rotation of the locking ring as the screw in threaded into the locking ring, while axial movement (vertically in FIG. 1) is restrained by the inclined flange 34 which with the inclined seat 33 jointly form a wedge that limits longitudinal movement of the ring 31 and, since the bent flange 34 compresses the ring 31 downwardly as well as radially inwardly, by the bias on the ring 31 against the seat 33 so imposed.

Referring to FIGS. 2 to 11, inclusive, the improved self-locking nut 10 is made from suitable bar stock 60 and successively machined by a lathe or screw machine to the shapes illustrated in FIGS. 2 to 6 in which the stock has been centrally initially circularly bored to form bore 62 throughout the desired length and the body 14 has been formed with the shoulder 18, undercut 20 and knurled annulus 21. Also, an extension or flange 74 is formed, i.e., the part above the knurled annulus 21, which initially comprises an outer cylindrical collar 70 and a portion of a truncated cone 72 whose outer wall diameter increases from its juncture with the collar 70 to the upper end of the cone 72, FIG. 4, and the central bore 62 is enlarged into a hole 76 which also provides the annular, circular, seat 33, preferably inclined as illustrated, the hole 76 having throughout its length the same diameter as the largest diameter of the seat 33, thus providing a thicker wall section at the upper end of the cone 72 relative to its wall thickness adjacent the juncture of the large hole 76 with the seat 33.

Thus, the seat 33 and the cylindrical wall 79 of the large hole 76 jointly define a central cavity 78 of larger volume and diameter than the portion of the central bore extending from the seat 33 down to the bottom (FIG. 4) of the nut blank, the term nut blank being used herein to designate the metallic part of the nut prior to completion thereof.

As illustrated in FIG. 2, the nut is still attached to the bar stock 60 and remains so attached until the shape of FIG. 6 is achieved at which time it is cut off from the bar stock, but in FIGS. 4 and 5 the bar stock has been omitted for clarity.

As illustrated in FIG. 4, a rigid arbor 80 having a non-circular, annular outer surface 81 and a crowned front 82 is inserted into the cavity 78 formed by the wall 79 and the seat 33. The arbor 80 is preferably of hexagon shape in cross-section, that is, its outer surface 81 is divided into six flat parts and the dimension across opposite corners of the hexagon is substantially equal to the diameter of the hole 76 but the arbor is slidable freely into the hole 76 until its crown abuts the seat 33.

The arbor 80 and the bar stock, to which the nut blank is still joined, are then rotated jointly so that there is substantially no relative rotation therebetween and a roller 90 is pressed against the outer surfaces of the collar 70 and cone 72, the roller 90 rotating about an axis parallel with that about which the nut blank and the arbor are rotating. The roller 90 has a cylindrical surface 92 and, at right angles thereto, a face 94 so as to reach substantially to the right angle corner between the collar the knurled annulus 21.

The roller 90 is pressed against the cone 92 only until the roller surface 92 meets the outer surface of collar 70 at which time the outer surface of what was initially the cone 72 and the outer surface of the collar 70 become one substantially cylindrical surface, FIG. 5, with a diameter substantially equal to that of the collar 70 before the pressing operation began. During the pressing operation just described, the roller 90 cold forms and flows the material of the cone 72 radially inwardly toward the arbor 80 and axially upwardly, as viewed in FIG. 4, forming an inclined and pointed, as illustrated in FIG. 5, upper flange end 75. Thereafter, the upper pointed end 75 is trimmed off to the flat top 77 shape illustrated in FIG. 6. The cold flow radially inwardly of flange material takes place to a greater extent near the top of the flange 74 than near the juncture of the large hole 76 with the seat 33.

Thus, at the conclusion of the pressing operation the heretofore mentioned cylindrical inner wall 79 (FIG. 4) remains continuous but assumes the irregular, non-circular, generally hexagon shape illustrated in FIGS. 6, 7, 12, 13 and 14, which are views after trimming off the upper end of the nut blank, comprising the six generally hexagon flats or sections 44, each of which comprises the flat surfaces 46 and a recess 48 (which were previously described), and define with the seat 33 a generally hexagon shaped counterborse or cavity 130, but the wall thickness of the flange 74 above the seat 33 is substantially uniform except for the area of the recess 48, FIG. 14.

By use of a cone 72 and collar 70 arrangement the thickness after rolling of the flange 74 is substantially uniform, when viewed in longitudinal section adjacent the hexagon corners as in FIG. 13, but the shape which the inner wall 79 assumes during the pressing operation is not completely hexagonal, due to the greater thickness of material at the upper end of the cone 72 and the fact that the operation is stopped before all of the wall 79 becomes hexagonal, having the recesses 48 heretofore described. That is, if the roller were pressed with a sufficient force against the cone 72 and collar 70 for a sufficient period, enough material flow would take place for the wall to become substantially entirely hexagonal, but this is not preferred, because of the keying relation between the recesses 48 and the outer wall 50 of the locking ring 31 which results in this invention helps retain and restrain the locking ring. In other words, the thickness of the flange 74 varies both circumferentially and along the length of the flange 74, because of the recesses 48, as shown in FIG. 14, the flange 74 being thickest at the top and decreasing in thickness gradually, so that adjacent the seat 33 it is thinnest.

As illustrated, the roller 90 is supported by an axle 96 and stationary frame plates 97 of a suitable fixture, partially illustrated in FIG. 4, and in FIG. 4 the roller is shown just prior to engagement with the surfaces of the cone 72 and collar 70.

After the top end of the extension 74 is trimmed, the nut blank is then cut off from the bar stock, FIG. 6.

Thereafter, the portion of the central bore between the lowest part of the seat 33 and the bottom (as viewed in FIG. 6) is threaded in a separate operation, but is not illustrated as threaded in FIG. 6.

While a hexagon shape is preferred for the arbor 80 an octagon shape or other non-circular configurations could be used, but a configuration resulting in sharp, abrupt corners, such as the upper corners 110 is preferred, FIG. 7.

Referring to FIGS. 8, 9 and 10 the locking ring is assembled to the lock nut blank after the bore through the body 14 has been threaded. The locking ring 31 is sheared from a supply of resilient material in flat, strip 112 form having holes 32 spaced along its length previously punched or otherwise formed therein, the strip being suitably fed between the flange 74 and the punch 125. The resilient material forming the strip 112 is deformable and preferably a plastic material, such as a synthetic resin which has a high degree of elasticity or memory, i.e., the ability to return substantially to its original shape after a force or pressure which deforms the ring has been removed therefrom, and such plastic materials are sometimes called elastomers. Further, this material is preferably one that has a high resistance to impact forces so that chipping or abrading during the tightening or loosening of the screws in the lock nuts is at a minimum. Also, preferably the material is one that has a high resistance to heat, the material being substantially uneffected up to about 250° F. It has been found that the material meeting all of these desirable characteristics is nylon which has been used to make embodiments of this invention.

While a prepunched strip 112 has been described in connecttion with FIGS. 8, 9 and 10 it is readily apparent that the method could be changed to utilize a strip that was punched with the holes 32 just prior to being inserted in the flange 74.

The strip 112 is sheared or pressed by a punch 125 which has a forward portion of cylindrical shape defining a horizontal, flat face 126 of larger diameter than the major dimension across diametrically opposite corners 110 (FIG. 7) of the generally hexagon shaped cavity 130, but preferably the face 126 has a diameter which is smaller than the outside diameter of the flange 74 at its upper end, FIGS. 8 and 9. Hence, the punch 125 does not enter the cavity 130 when it is forced down upon the strip 112 but it compresses the strip, i.e., it first squeezes or mashes the strip 112 toward the cavity 130 between the upper end surface of the flange 74 and the punch surface 126, and as the movement of the punch continues downwardly the portion of the strip directly above the cavity 130 is pressed down below its upper, inner edge and sheared off to a shape closely conforming to the shape of the upper inner edge of the wall 79. Thus, the locking ring outer wall 50 at the end of the punching operation closely conforms and mates with the inner wall 79.

Referring to FIG. 8, when the punch face 126 contacts the upper surface of the strip 112, and continues downward, it compresses an annular portion 115 of the strip 112 between the flat end surface 77 of the flange 74 and the punch face 126, the annular portion 115 being distinctively hachured in FIG. 8 for purposes of illustration. The annular portion 115 may be considered as a thin walled tube of original height equal to the thickness of the strip 112, having an inside (vertical) hexagonal surface defined by the upper inside edge of the flat surface 77 and an outside (vertical) cylindrical surface equal in diameter to the outer diameter of the punch 125 or punch face 126. When the punch face 126 moves sufficiently close to the top surface 77 it severs the strip 112 through the annular portion 115, some of the annular portion 115 being displaced toward the pilot 134 and some away therefrom. The part of the annular portion which is deformed and displaced toward the pilot 134 is forced into the cavity 130 and, due to the memory or resilience of the material forming the strip 112, the resulting ring 131 tends to be diametrically slightly larger than the cavity 130. The remainder of the annular portion 115 which does not become part of the ring 31, is forced outward, causing the strip 112 to deform around the punch 125, as illustrated by the sloping portion 132 in FIG. 9, and clings tightly to the punch at 120.

As the cutting operation concludes, the punch 125 remains momentarily in place, and the ring 31 tends to spring or pop into the cavity 130 against the upper portions of the seat 33, FIG. 9, the locking ring assuming a position in which its upper surface is slightly below the upper flat surface 77. The force on the punch is sufficient to shear the locking ring 31 from the strip 112, but not great enough to substantially deform the nut blank.

As illustrated, the punch face 126 carries a pilot 134 which has a rounded nose, the pilot being inserted into the prepunched holes of the strip 112 to maintain the prepunched holes open and to aid in centering the nut blank under the punch, since the punch pilot 134 extends into the threaded part of the nut blank, tending to insure that the hole in the ring 31 is properly aligned coaxially with the threads in the nut blank.

Preferably, the thickness of the strip 112 is equal to or slightly less than the distance between the juncture of the seat 33 and the inner wall 79 and the upper end of the flange 74.

When the dimension of the punch face 126 is as heretofore described, it has been found that the locking strip material forms around the punch, as indicated at 120 in FIG. 9, during the punching operation heretofore described. The material 120 clings to the punch 125 and its separation therefrom is facilitated by a stationary stripper knife 122. If the punch is made with a face diameter larger than the outside diameter of the flange 74 at its upper end, FIG. 9, the plastic forms down around the flange 74 during insertion of the ring into the cavity 130 and the strip material which thus forms down around the flange 74 is more difficult to remove therefrom than the strip material 120 which forms when the punch face diameter is a shown in FIG. 9. It should also be noted that if the punch face diameter were made to closely conform to the shape of the cavity 130, each nut blank would have to be aligned with the punch, vastly complicating the punching and inserting of the locking ring into the cavity.

After the locking ring 31 has been inserted into the cavity 130, as described in connection with FIG. 9, a closing punch device 140 (FIG. 11) is used to bend radially inwardly the flange 74, illustrated in FIG. 9, to form the bent flange designated as 34 is FIGS. 1, 11 and 15.

The closing punch device 140 comprises a cylindrical punch 142 from which extends a pilot 146, the pilot 146 having mostly a cylindrical shape with a curved and tapered forward section, as illustrated in FIG. 11, and the punch 142 being slidably mounted within an annular closing punch 150. The closing punch 150 has a tapered inner surface 151, as illustrated in FIG. 11, and after the punch 142 has been moved down into engagement with the upper annular face 145 of the locking ring 31, with the pilot extending through the hole in the locking ring at this time, so as to bias the locking ring against the seat 33, the closing punch 150 is forcefully lowered to bring the inner tapered surface 151 into engagement with the upper part of the flange, to bend the latter radially inwardly and downwardly but not over the top surface of the locking ring 31, and thereby form the bent flange 34.

During the closing punch operation, the pilot 146 remains within the locking ring 31, of course, and the annular face 144 of punch 142 remains against the ring 31. The locking ring is at this time compressed and deformed against the seat 33, against the pilot 146 and against the annular face 144. Thus, when the punch 142 is removed, after bending of the flange is accomplished, the size of the hole 32 in the locking ring 31 becomes smaller than before insertion of the locking ring 31 into the cavity 130 and due to the fact that the flange 34 is bent inwardly more at its upper than its lower portion, the hole varies in size along the length of the locking ring, being smallest in diameter at its upper end where the compressive force is largest and largest in diameter at its lower end where the compressive force is smallest, the larger hole size at the lower end, facilitating entrance of the screw during assembly of the screw to the locking nut.

The diameter of the hole 32 is initially made such and the material of the locking ring 31 is stiff enough, that the compressive force exerted by the flange 34 result in hole diameters along its length, which are all smaller than the root diameter of the threads in the nut body 14 but larger than the root diameter of the screw 26, so that the resulting size of the hole 32 is large enough to permit entry of the screw but small enough to be deformed as the screw enters for tightly engaging the screw threads when the latter are threaded through the locking ring 31. Due to the varying size of the hole 32, more deformation takes place near the top of the ring 31 than near its bottom, as the screw advances, but the deformation of the locking ring 31 which takes place at this time is sufficient to produce the desired locking result against the unthreading or loosening tendency of vibrations, shocks, etc.

Referring to FIG. 9, it is seen that at the conclusion of the punching operation no part of the flange 34 overlies the top of the locking ring 31. In addition to the advantages heretofore mentioned, this allows some creep upward of the nylon upper surface edge portions when the screw 26 is inserted through the locking ring 31, FIG. 1.

Retention of the locking ring against axial movement and restraint against rotation is also a function of the extent to which the flange is bent inwardly away from a vertical plane, as viewed in FIG. 11 for example, and such bending may vary from that illustrated in the drawings if more or less retention and/or restraint is desired.

A modification of the method for assemblying the locking ring to the nut blank comprises in first bending the flange 74 with a punch similar to the closing punch 150 (but not illustrated) to the extent noted in connection with FIG. 10 and then molding a suitable plastic within the cavity, as generally illustrated in FIG. 17. FIG. 17 illustrates a fixture having a central supply conduit forming a passage 180 through which is ejected a plastic material to form the locking ring 31 in the generally hexagon shaped cavity 30. The fixture includes an upper annular surface 199 whose peripheral edge abuts the upper edge of the flange 34 to close the cavity 30 at the top and a lower annular portion 195 abutting the threads to close the cavity at the bottom. If desired, a plug 185 may be threaded into the threaded bore to minimize the flow of plastic material into the threads of the nut during the molding of operation.

While the invention has been illustrated in connection with one particular form of clinch or press nut it is seen that other shapes could be given to the outer surface of the nut body for accomplishing the clinching or pressing into the receiving plate. Also, while the foregoing description has been in terms of a clinch nut it is seen that the outer surface of the nut body could be provided with the familiar hexagon shape, or other flat surfaces, suitable to receive a tool to aid in assembly and removal of the nut to the screw, as illustrated in the modification of FIG. 16, wherein a self-locking nut 200 is illustrated having a nut body 202 provided with hexagon flats 204 (instead of the shoulder 18, undercut 20 and knurled annulus 21 illustrated in FIG. 1) but is otherwise constructed as described in connection with the previous embodiments.

Having described the invention, what I claim is:

1. A self-locking nut comprising a body and an integral extension, said body having a threaded bore, said extension having an enlarged counterbore coaxial with said threaded bore and defining an annular seat adjacent thereto, said extension including a generally axially extending flange having an inner wall which is non-circular when viewed in a plane transverse to the length of the nut, and a resilient locking ring housed entirely within said extension and being positioned on said seat, said ring having an outer non-circular surface mating with said flange inner wall, said flange inner wall comprising an annular array of substantially flat surfaces and outwardly recessed sections intermediate the end portions of said flat surfaces, said recessed sections receiving, in keying relationship therewith, radially outer portions of said ring, said recessed sections being undercut whereby the depth of said sections is greater at the end thereof closer to said body than at the end remote from said body, said ring having a hole defined by an inner surface lockingly engageable by a screw threadable through said body, the diameter of said hole being less than the root diameter of the thread in said bore, whereby said ring is restrained against rotation and against axial movement when said screw is threaded into said ring, the end of said flange opposite to said body being bent in toward said body to compress said ring against said seat and thereby retain said ring against axial movement.

2. The combination recited in claim 1 wherein said ring is formed of plastic material and said ring is radially slightly larger than said counterbore.

3. The combination recited in claim 1 wherein said ring is formed of plastic material and said flange inner wall is inclined, at least in part, toward said seat to wedge said ring between said flange inner wall and said seat.

4. The combination recited in claim 3 wherein said ring is radially slightly larger than said counterbore so that said flange inner wall tends to compress said ring radially inwardly.

5. The combination recited in claim 1 wherein said extension has a continuous annular shape.

6. The combination recited in claim 1 wherein said body includes a shoulder and a spaced knurled flange defining therebetween an undercut, whereby when said knurled flange is driven into a sheeted plate displacement of the plate material into the undercut takes place to thereby secure the nut to said plate.

7. The combination recited in claim 1 wherein said body has an outer surface divided into flats to receive a suitable tool, and said extension has a continuous annular shape.

(References on following page)

References Cited by the Examiner

UNITED STATES PATENTS

| | | | |
|---|---|---|---|
| 2,283,850 | 5/1942 | Danforth | 151—7 |
| 2,346,456 | 4/1944 | Ruthven | 10—86 |
| 2,351,057 | 6/1944 | Luce | 10—86 |
| 2,385,927 | 10/1945 | Mason | 151—7 |
| 2,407,314 | 9/1946 | Mason | 10—86 |
| 2,442,067 | 5/1948 | Williams | 10—86 |
| 3,018,519 | 1/1962 | Morin et al. | 18—36 |
| 3,040,796 | 6/1962 | Gouverneur | 151—7 |
| 3,125,146 | 3/1964 | Rosan | 151—41.73 |

FOREIGN PATENTS

| | | |
|---|---|---|
| 123,346 | 1/1947 | Australia. |

THOMAS F. CALLAGHAN, *Primary Examiner.*

R. S. BRITTS, *Assistant Examiner.*